Aug. 29, 1967     F. W. LINDBLAD     3,338,230

SAW AND SEGMENT THEREFOR

Filed Nov. 25, 1964

INVENTOR
FREDERICK W. LINDBLAD by: *Morris Spector*

ATTY.

United States Patent Office 3,338,230
Patented Aug. 29, 1967

3,338,230
SAW AND SEGMENT THEREFOR
Frederick W. Lindblad, 835 Illinois Ave.,
Aurora, Ill. 60505
Filed Nov. 25, 1964, Ser. No. 413,762
14 Claims. (Cl. 125—15)

ABSTRACT OF THE DISCLOSURE

A saw has a circular disc body. Arcuate cutting segments formed of diamond-abrasive particles embedded in a matrix are bonded to the periphery of the disc body. The segments are formed with radially and axially outwardly presented peripheral surfaces with ribs projecting from those surfaces and spaced along the length thereof. The ribs have work-engaging surface areas which are small as compared to the areas of the peripheral surfaces from which the ribs project.

---

This invention relates to circular saws of the type used for sawing concrete, granite or similar hard materials.

The present invention is concerned with improvements in saws of the type that have a saw body formed of a circular disc, and arcuate segments secured to the periphery of the disc and constituting the teeth or cutting edge of the saw. The segments are formed of abrasive particles, such as diamond abrasive particles, embedded in a suitable matrix of metal or the like. The segments and the disc are made separately and then the segments are secured to the disc in a suitable manner, as by solder or other means.

Since the segments are molded with the peripheral cutting surfaces smooth, the diamond particles are flush against those surfaces and are substantially completely embedded in the matrix. For this reason difficulties have been experienced in starting the saw cutting, and it has been a practice to "break in" the saw by abrading a sufficient amount of the matrix material at the cutting surfaces to expose the diamond particles. Where the matrix is of a highly wear resistant composition, as when the matrix has a high content of tungsten carbide or nickel, considerable time and expense may be required to break in the saw.

It is, therefore, an object of the present invention to provide a saw of the type stated which eliminates the need for a separate breaking in operation prior to the use of the saw.

It is a more specific object of the present invention to provide, in and for a saw of the type stated, abrasive segments in which the cutting surfaces are formed with outward projections or ribs that provide comparatively small areas of contact with the work as the saw is initially used so that the matrix at the surfaces of the ribs wear down almost immediately to expose abrasive particles and cause the saw to begin cutting.

In assembling the segments with the disc, it sometimes happens that one or more of the segments either ends up a fraction of a degree or so eccentric to the axis of rotation of the saw, or is axially offset from the other segments. In either case, the corresponding side faces of all of the sgements are out of alignment with the result that the saw chatters. It also sometimes happens that the radially outer surface of one or more of the segments is a few thousandths of an inch out-of-round or that one or more segments end up mounted on the saw disc with the radially outer surface of the segment outwardly beyond its intended position. When that occurs, the saw tends to bounce when the misaligned segment or segments engage the work.

Since the ribs or projections on any saw segment of the present invention provide only small areas of initial contact with the work, the ribs that contact the work wear quickly and the effect of the irregularities of the segments is soon abated with the result that very quickly the cutting edge of the saw becomes in radial and axial contact with the work along surface portions of the segments which are in proper alignment. It is, therefore, a further object of the present invention to provide a saw of the type stated which minimizes vibrations due to irregularities in the shape and position of one or more of the segments.

In a saw of the foregoing type, the rate of reduction in the height or radial dimension of the segments due to wear is much greater than that of the reduction in width of the segments. For example, when the height of the segments has been reduced about fifty per cent, the width has been reduced by only about eight per cent. Thus the ribs on the peripheral surface will wear down completely in a very short period of time whereas the ribs on the side or axial surfaces of the segments wear comparatively slowly. As a result, the ribs on the side surfaces cooperate with those side surfaces to provide, during a substantial portion of the life of the saw, channels through which cooling liquid may flow radially outwardly across the segments.

It is, therefore, a further object of the present invention to provide a saw of the type stated in which the segments are designed to facilitate the flow of coolant radially outwardly thereover where the work is being cut.

The attainment of the above and further objects of the present invention will be apparent from the following specification taken in conjunction with the accompanying drawing forming a part thereof.

Figure 1:
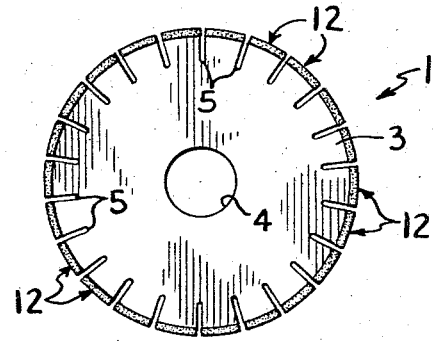
FIG. 1 is an elevational view of a saw constructed in accordance with and embodying the present invention.
Figure 2:
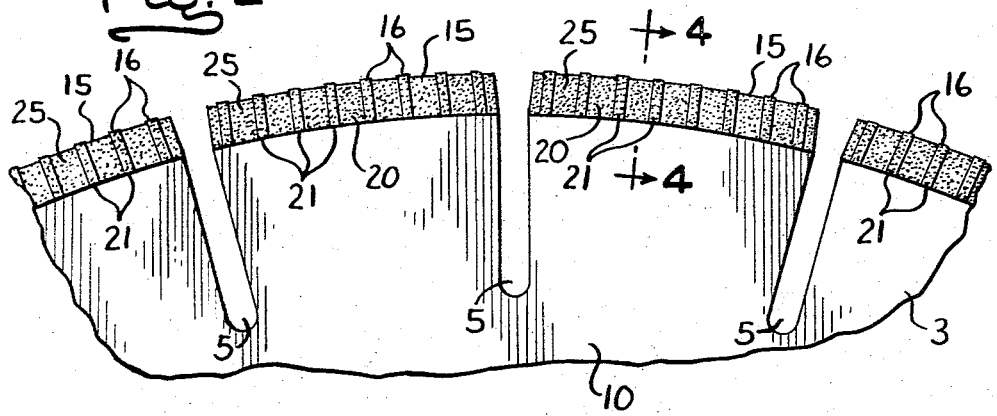
FIG. 2 is a fragmentary elevational view, on an enlarged scale, of a portion of the saw of FIG. 1.
Figure 3:
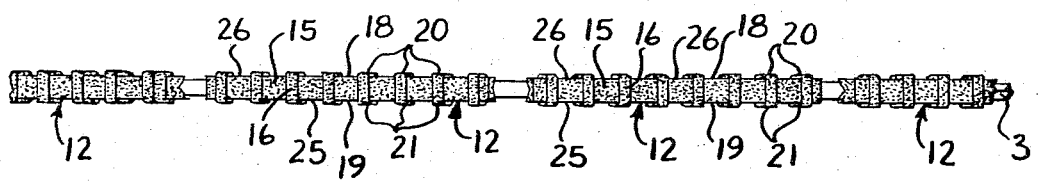
FIG. 3 is a fragmentary top plan view of the part of saw shown in FIG. 2.
Figure 4:
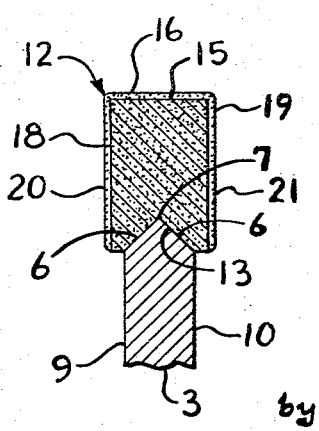
FIG. 4 is a fragmentary sectional view taken along line 4—4 of FIG. 2.

Referring now in more detail and by reference characters to the drawing, which illustrates a preferred embodiment of the present invention, 1 designates a circular saw comprising a disc body 3 having a central opening 4 or other conventional means for mounting the disc 3 on a power driven saw arbor. The disc 3 may be a conventional hardened and tensioned steel disc or it may be of any other suitable material, for example, a laminated fibrous material. The disc 3 has a series of slots 5 extending inwardly from its outer periphery for cooling and swarf clearance. At its outer periphery, the disc 3 has tapered surfaces 6, 6, which taper to an edge 7 which forms an annular ridge centered between the side faces 9, 10 of the disc 3.

A series of cutting segments 12, preferably identical segments, are assembled to the outer periphery of the disc 3 with the ends of the segments spaced apart at the slots 5. Each segment 12 is preferably greater in width than the width of the disc 3 immediately radially inwardly of the tapered surfaces 6, 6. Each of the segments 12 is preferably a diamond cutting segment of compositions known in the art and including diamond abrasive particles embedded in a suitable matrix, which may be cast, pressed, sintered, or powdered metal. The matrix may also be of a ceramic or resinous plastic material. Metallic matrices containing a high percentage of tungsten carbide or nickel may be used. Furthermore, where the matrix is of metal, the segments may be suitably pre-hardened.

The bottom surface of each segment 12 has a longitudinally extending V groove or notch 13 having a shape which is a counterpart of the tapered surfaces 6, 6 and fits thereover and is secured thereto by an interposed bonding film of solder or other adhesive, for example, an epoxy resin adhesive. The counterpart surfaces on the disc 3 and segment 12 align the segments 12 on the disc 3 and center them between the opposite sides 9, 10 of the disc 3 and also prevent relative axial movement of the segments 12 on the disc 3.

Integrally formed on the radial cutting surface 15 of each segment 12 are outwardly projecting ribs 16, and similarly integrally formed on the axial cutting surfaces 18, 19 are outwardly projecting ribs 20, 21. Preferably the ribs on the respective surfaces 15, 18, 19 extend across the full width of the surface and are longitudinally spaced along the surface. These ribs 16, 20, 21 are relatively shallow, and the ribs on each surface have surface areas which are small as compared to the total area of the surface from which the ribs project. For example, in a segment having an overall height of the order of ¼", a width of the order of ⅛" and a length of the order of 1 15/16", there may be eight ribs on each surface with the ribs each being about .062" wide and having a height (i.e. project from their adjacent surfaces) of about .01".

When the saw is initially used, those of the ribs 16, 20, 21 that contact the work bear the entire brunt of the reaction forces imposed by the work. Since the surface areas of those ribs are small as compared to the areas of the surfaces 15, 18, 19, those ribs begin to wear almost immediately and the matrix at the surfaces of the ribs is eroded away to expose diamond particles so that the saw may cut the work. Furthermore, the wear on those ribs results in an almost immediate wear of irregularities of the segments so that the cutting edge of the saw comes into relatively vibration free peripheral and axial contact with the work.

Since the ribs 16, 20, 21 are integrally formed with the segments 12 and project only a small distance outwardly from their associated surfaces, the ribs are supported against the reaction forces created during cutting of the work and do not tend to break off.

The ribs 20, 21 cooperate with the surfaces 18, 19 to provide a series of channels 25, 26 on each side of each segment through which coolant may flow at the cut in the work and radially outwardly over the segments as the saw is in use. Since the lateral wear of the segments is at a rate which is less than that of the peripheral wear, the ribs 20, 21 wear more slowly than the ribs 16. Thus, the ribs 20, 21 will provide cooling channels 25, 26 for a substantial if not the overwhelming portion of the life of the saw segments.

As the segments 12 wear, the cutting surfaces tend to wear down to a generally V shape approximating the shape of the surfaces 6, 6, thereby permitting a more complete utilization of the segments 12 as they become worn with use.

In compliance with the requirements of the patent statutes, I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. In a saw comprising a circular disc, and means forming a cutting region at the periphery of the disc, said means comprising arcuate segments secured to said periphery and including abrasive particles embedded in a matrix, an improvement comprising said segments each having at least one peripheral surface with ribs projecting from said surface, said ribs having work-engaging surface areas which are less than the area of the peripheral surface between the ribs to provide small areas of contact with the work for abating irregularities in the segments during the break-in period of the saw.

2. In a saw comprising a circular disc, and means forming a cutting region at the periphery of the disc, said means comprising arcuate segments secured to said periphery and including abrasive particles embedded in a matrix, the improvement comprising said segments each having a radially outwardly presented surface with ribs projecting radially outwardly from said surface and spaced circumferentially along the length of said surface and constituting temporary cutting areas adapted to be worn down to said surface.

3. In a saw comprising a circular disc, and means forming a cutting region at the periphery of the disc, said means comprising arcuate segments secured to said periphery and including abrasive particles embedded in a matrix, an improvement comprising said segments each having axially presented peripheral surfaces with ribs projecting axially from said surfaces and spaced along the lengths of said surfaces, said ribs having work-engaging surface areas which are less than the areas of the peripheral surfaces between the ribs.

4. For use with a saw comprising a circular disc, means for forming a cutting region at the periphery of the disc, said means comprising arcuate segments adapted to be secured to said periphery and including abrasive particles embedded in a matrix, said segments having axially and radially outwardly presented surfaces with ribs projecting from said surfaces, the ribs on each surface being spaced along the length of that surface.

5. In a saw comprising a circular disc, and means forming a cutting region at the periphery of the disc, said means comprising arcuate segments secured to said periphery and including abrasive particles embedded in a matrix, an improvement comprising said segments each having axial and radially outwardly presented peripheral surfaces with ribs projecting from said surfaces, the ribs on each surface being spaced along the length of that surface.

6. In a saw comprising a circular disc, and means forming a cutting region at the periphery of the disc, said means comprising arcuate segments secured to said periphery and having peripheral surfaces, the segments including abrasive particles embedded in a matrix and wherein abrasive particles at said peripheral surfaces are substantially completely embedded in the matrix, an improvement comprising means projecting from said peripheral surfaces for providing cutting areas for cutting the work when the saw is initially used, said cutting areas on each segment being less than the total area of the peripheral surfaces on the segment so that said projecting means wear upon initial use of the saw and thereby expose abrasive in the matrix.

7. In a saw comprising a circular disc, and means forming a cutting region at the periphery of the disc, said means comprising arcuate segments secured to said periphery and having peripheral surfaces, the segments including diamond abrasive particles embedded in a matrix substantially of metal and wherein diamond particles at said peripheral surfaces are substantially completely embedded in the matrix, an improvement comprising said peripheral surfaces having axial and radially outwardly presented surface portions each having ribs spaced along the lengths of the respective surfaces from which the ribs project, at least some of said ribs providing cutting areas for cutting the work when the saw is initially used so that said cutting areas wear upon initial use of the saw and thereby expose abrasive in the matrix.

8. A saw according to claim 7 in which the metal includes metals of the group consisting of tungsten carbide and nickel.

9. In a saw comprising a circular disc the peripheral edge of which is of reduced thickness, and a cutting region comprising arcuate segments that include diamond abrasive particles embedded in a matrix, said segments surrounding the periphery of the disc and each having a notch which is a counterpart of and fits over the edge of the disc with an interposed adhering film, the counterpart surfaces being of a shape to align the segments on the disc and center them between opposite sides of the disc, each segment being of an axial thickness greater than that of the disc adjacent to but spaced from said peripheral edge, an improvement comprising said segments each having at least one peripheral surface with ribs projecting away from said surface, said ribs having work-engaging surface areas which are less than the area of the peripheral surface between the ribs.

10. In a saw comprising a circular disc the peripheral edge of which is of reduced thickness, and a cutting region comprising arcuate segments that include diamond abrasive particles in a matrix, said segments surrounding the periphery of the disc and each having a notch which is a counterpart of and fits over the edge of the disc with an interposed adhering film, the counterpart surfaces being of a shape to align the segments on the disc and center them between opposite sides of the disc, each segment being of an axial thickness greater than that of the disc adjacent to but spaced from said peripheral edge, an improvement comprising said segments having axial and radially outwardly presented surfaces with ribs projecting from each of the surfaces and with the ribs on each surface spaced along the length thereof, said ribs having work-engaging surface areas which are less than the areas of the peripheral surfaces between the ribs.

11. A saw having a saw segment comprising abrasive particles embedded in a matrix and said segment having at least one peripheral surface, and ribs projecting outwardly from said surface and spaced along the length thereof, said ribs having work-engaging surface areas which are less than the area of the pheripheral surface between the ribs to provide small areas of contact with the work for abating irregularities in the segments during the break-in period of the saw.

12. A saw segment comprising an arcuate body having diamond abrasive particles embedded in a matrix and having a radially outwardly presented generally cylindrical surface with ribs projecting radially outwardly from said surface and spaced along the length thereof, said ribs having work-engaging areas which are less than the area of the surface between the ribs.

13. A segment for a circular saw comprising an arcuate body formed of diamond abrasive particles embedded in a matrix, said body having generally planar axial surfaces and a generally cylindrical radially outer surface, and ribs projecting from each of said surfaces and being spaced along the length thereof, said ribs having work-engaging areas which are less than the area of the surface between the ribs.

14. A segment according to claim 13 having a notch opposite its radially outer surface for receiving the periphery of a saw disc.

References Cited

UNITED STATES PATENTS

| | | | |
|---|---|---|---|
| 2,763,105 | 9/1956 | Feeley | 51—207 |
| 2,811,960 | 11/1957 | Fessel | 51—206 X |
| 3,016,661 | 1/1962 | Nielsen | 51—206 |
| 3,146,561 | 9/1964 | Lindblad | 51—206.4 |

FOREIGN PATENTS

| | | |
|---|---|---|
| 610,977 | 6/1926 | France. |
| 403,159 | 12/1933 | Great Britain. |

ROBERT C. RIORDON, *Primary Examiner.*

D. G. KELLY, *Assistant Examiner.*